United States Patent
Friedel

(10) Patent No.: US 12,043,738 B2
(45) Date of Patent: Jul. 23, 2024

(54) SILICONE SEALANT HAVING ADJUSTABLE FLOW PROPERTIES

(71) Applicant: SIKA TECHNOLOGY AG, Baar (CH)

(72) Inventor: Manuel Friedel, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 1025 days.

(21) Appl. No.: 16/960,237

(22) PCT Filed: Dec. 21, 2018

(86) PCT No.: PCT/EP2018/086619
§ 371 (c)(1),
(2) Date: Jul. 6, 2020

(87) PCT Pub. No.: WO2019/134863
PCT Pub. Date: Jul. 11, 2019

(65) Prior Publication Data
US 2021/0062001 A1    Mar. 4, 2021

(30) Foreign Application Priority Data

Jan. 3, 2018 (EP) .................................... 18150164

(51) Int. Cl.
| | |
|---|---|
| C09J 5/00 | (2006.01) |
| C08L 83/04 | (2006.01) |
| C09D 7/61 | (2018.01) |
| C09D 183/04 | (2006.01) |
| C09J 11/04 | (2006.01) |
| C09J 183/04 | (2006.01) |
| C09K 3/10 | (2006.01) |

(52) U.S. Cl.
CPC ............... *C08L 83/04* (2013.01); *C09D 7/61* (2018.01); *C09D 183/04* (2013.01); *C09J 5/00* (2013.01); *C09J 11/04* (2013.01); *C09J 183/04* (2013.01); *C09K 3/1018* (2013.01); C08L 2205/025 (2013.01); C08L 2312/00 (2013.01); C09J 2483/00 (2013.01); C09K 2200/0685 (2013.01)

(58) Field of Classification Search
CPC ............ C08L 83/04; C08L 2205/025; C08L 2312/00; C09D 7/61; C09D 183/04; C09J 5/00; C09J 11/04; C09J 183/04; C09J 2483/00; C09K 3/1018; C09K 2200/0685; C08G 77/16; C08K 3/36; C08K 5/44; C08K 5/5419; C08K 5/5425; C08K 5/57
See application file for complete search history.

(56) References Cited

U.S. PATENT DOCUMENTS

| | | | |
|---|---|---|---|
| 4,499,234 A | 2/1985 | Pratt et al. | |
| 5,017,628 A | 5/1991 | Dietlein | |
| 2004/0220331 A1* | 11/2004 | Sixt | ...................... C08K 5/5419 524/860 |
| 2020/0239688 A1* | 7/2020 | Sixt | .......................... C08L 83/04 |

FOREIGN PATENT DOCUMENTS

| | | |
|---|---|---|
| DE | 103 19 303 A1 | 12/2004 |
| WO | 2013/022532 A1 | 2/2013 |

OTHER PUBLICATIONS

Dubitsky et al., "Tin Catalysed Hydrolysis of Vinyltrialkoxysilanes Studied by NMR Spectroscopy," Journal of Materials Science Letters, 19 (2000), pp. 627-629, Kluwer Academic Publishers (Year: 2000).*
Zhang et al.; "Synthesis of polysilisiquioxane used as core layer material of optical waveguide;" J Sol-Gel Sci Technol; 2010; pp. 197-202; vol. 56.
Jan. 30, 2019 Search Report issued in International Patent Application No. PCT/EP2018/086619.
Jul. 7, 2020 International Preliminary Report on Patentability issued in International Patent Application No. PCT/EP2018/086619.

* cited by examiner

*Primary Examiner* — Cynthia L Schaller
(74) *Attorney, Agent, or Firm* — Oliff PLC

(57) ABSTRACT

A single-component moisture-curable silicone composition including 100 parts by weight of at least one crosslinkable polydiorganosiloxane having silanol end groups, 5 to 20 parts by weight of at least one hydrophilic silica, 1 to 10 parts by weight of at least one organoalkoxysilane or organoalkoxysiloxane crosslinker that contains at least 2 alkoxysilane groups, 1 to 7 parts by weight of organoalkoxysilane or organoalkoxysiloxane that contains at least one aminoalkyl group having a primary amino group, 0.1 to 7 parts by weight of at least one tin catalyst, up to 5 parts by weight of organoalkoxysilane or organoalkoxysiloxane that contains at least two alkoxysilane groups, wherein silicone composition contains less than 1.0% by weight of water based on total composition, with proviso where reactivity in respect of hydrolysis of organoalkoxysilane or organoalkoxysiloxane is greater than reactivity in respect of hydrolysis of organoalkoxysilane or organoalkoxysiloxane crosslinker.

12 Claims, No Drawings

SILICONE SEALANT HAVING ADJUSTABLE FLOW PROPERTIES

TECHNICAL FIELD

The invention relates to a one-component moisture-curable silicone composition, to a method for bonding or joining with the composition, and to the use thereof.

PRIOR ART

Silicones are known compositions that have long been used as adhesives or sealants. Such silicones can be designed as one- or two-component silicone formulations and contain as main components a polyorganosiloxane and a crosslinker. A distinction is made between cold-crosslinking RTV silicones (RTV=room-temperature crosslinking/vulcanizing) and hot-crosslinking HTV silicones (HTV=high-temperature crosslinking/vulcanizing). One- and two-component RTV silicones are also referred to respectively as RTV-1 silicones and RTV-2 silicones.

RTV-1 silicones have long been known. It is likewise known that formulations of this kind can be cured on the basis of so-called neutral crosslinking. Neutral crosslinking systems classically release oxime compounds, which have an odor that is perceived as very unpleasant and are harmful to health. RTV-1 silicones can alternatively be formulated with crosslinkers containing alkoxy groups. The crosslinking elimination products are then alcohols, which have a considerably less unpleasant odor. The crosslinkers used are generally monomeric silanes.

In addition, it is known that the addition of hydrophilic (uncoated), usually fumed silica increases the viscosity of silicone compositions, especially at low shear rates up to a state of rest. This effect is observed particularly when silicone polymers having hydroxyl end groups are used.

This increase in viscosity when at rest is desirable in creep-resistant compositions, in which thixotropic behavior prevents the applied compositions from running on inclined or vertical surfaces. However, this also leads to problems in certain applications. When the gaps to be glued or joints are very narrow, low-viscosity or even self-leveling compositions are preferred, since they are much better at filling small volumes and increase the contact area. The same applies to potting compounds and coatings, in which creep resistance is likewise undesirable.

One way of achieving self-leveling properties in silicone compositions and of adjusting them within certain limits is to use short-chain silicone polymers of low viscosity as binders or else to use larger amounts of silicone plasticizers. Silicone plasticizers can be unreactive, but this increases the risk of the plasticizers migrating or bleeding, thus favoring, for example, the development of persistent spotting in the bonding substrate. In contrast, reactive plasticizers and the short-chain silicone polymers mentioned above frequently result in an increase in the modulus of the compositions and thus to embrittlement, which significantly limits their use as a low-modulus sealant.

Another option for increasing the self-leveling properties of filled RTV-1 silicone compositions considerably without having to use large amounts of plasticizers is taught in WO 2013/022532 A1. Good self-leveling properties are achieved by using "masked" silicone polymers, for example silicone polymers having alkoxysilane end groups, and surface-treated, hydrophobized silica as filler. However, this method has some disadvantages. For example, the choice of silicone polymers is limited to more costly, end-capped silicone polymers and it is not possible to influence the flow properties of the composition and, for example, to adjust it to the desired viscosity values or capacity for thixotropy. Moreover, this teaching is suitable above all for ketoxime crosslinkers, which is less preferable for health reasons.

U.S. Pat. No. 5,017,628 likewise describes a self-leveling silicone composition that is suitable as a low-modulus sealant and, in addition to a silicone polymer having hydroxyl end groups, also comprises silicone plasticizers, siloxane crosslinkers, a diacetamido-functional silane, and a hydrophobized, surface-treated filler. Disadvantages are the mandatory use of the diacetamido-functional silane and the need for the filler to be hydrophobized. There is also no possibility here of adjusting the extent of the flow properties.

There is therefore a need for an RTV-1 silicone composition that does not have the disadvantages mentioned just above, but nevertheless has self-leveling properties and is able to be used as a low-modulus class 20 sealant (LM or HM, type F or G) as defined in ISO 11600. There is also a need to be able to adjust the flow properties and thus the extent of the self-leveling behavior of a composition of this kind through the relative amount of certain constituents.

SUMMARY OF THE INVENTION

It is therefore an object of the present invention to provide a one-component moisture-curable silicone formulation that can be formulated oxime-free with common silicone polymers having hydroxyl end groups (silanol end groups), hydrophilic silica fillers without surface modification, and customary silane or siloxane crosslinkers, but that nevertheless has adjustable self-leveling properties, does not exhibit plasticizer migration, and can be used as a low-modulus sealant.

It was surprisingly found that the flow properties of the composition can be adjusted and the desired self-leveling properties achieved by using up to 5 parts by weight of a highly reactive organoalkoxysilane or organoalkoxysiloxane in a silicone composition comprising 100 parts by weight of a crosslinkable polydiorganosiloxane having silanol end groups, 5 to 20 parts by weight of a hydrophilic silica, 1 to 10 parts by weight of a less reactive organoalkoxysilane or organoalkoxysiloxane crosslinker, 1 to 7 parts by weight of an organoalkoxysilane or organoalkoxysiloxane that contains at least one aminoalkyl group having a primary amino group, and 0.1 to 7 parts by weight of a tin catalyst. If the composition is free of the highly reactive organoalkoxysilane or organoalkoxysiloxane or contains only very small proportions, for example up to 1 part by weight, the composition is self-leveling. At higher proportions, for example between 1 and 5 parts by weight, the composition becomes progressively more creep-resistant as the proportion of the highly reactive organoalkoxysilane or organoalkoxysiloxane in the composition increases.

The composition of the invention may be formulated as a self-leveling or creep-resistant composition and has excellent mechanical properties that make it suitable as a low-modulus class 20 sealant (LM or HM, type F or G) as defined in ISO 11600.

Further aspects of the invention are the subject of further independent claims.

Particularly preferred embodiments of the invention are the subject of the dependent claims.

Way of Executing the Invention

The present invention relates to a one-component moisture-curable silicone composition comprising a) 100 parts by weight of at least one crosslinkable polydiorganosiloxane OH-PDMS having silanol end groups and a viscosity at 23° C. of 1000 to 350 000 mPa·s, measured in accordance with DIN EN ISO 3219;
b) 5 to 20 parts by weight of at least one hydrophilic silica KS;
c) 1 to 10 parts by weight of at least one organoalkoxysilane or organoalkoxysiloxane crosslinker V that contains at least 2 alkoxysilane groups;
d) 1 to 7 parts by weight of an organoalkoxysilane or organoalkoxysiloxane AS that contains at least one aminoalkyl group having a primary amino group;
e) 0.1 to 7 parts by weight of at least one tin catalyst K;
f) up to 5 parts by weight of an organoalkoxysilane or organoalkoxysiloxane OS that contains at least two alkoxysilane groups;

wherein the silicone composition contains less than 1.0% by weight of water, preferably less than 0.5% by weight of water, in particular less than 0.1% by weight of water, based on the total composition, with the proviso that the reactivity in respect of hydrolysis of the organoalkoxysilane or organoalkoxysiloxane OS is greater than the reactivity in respect of hydrolysis of the organoalkoxysilane or organoalkoxysiloxane crosslinker V.

Substance names beginning with "poly", for example polydimethylsiloxane, refer in the present document to substances formally containing two or more of the functional groups that occur in their name, for example dimethylsiloxane groups, per molecule.

The term "polymer" in the present document firstly encompasses a collective of macromolecules that are chemically uniform but differ in relation to degree of polymerization, molar mass, and chain length, said collective having been prepared by a "poly" reaction (polymerization, polyaddition, polycondensation). The term secondly also encompasses derivatives of such a collective of macromolecules from "poly" reactions, i.e. compounds that have been obtained by reactions, for example additions or substitutions, of functional groups on defined macromolecules and that may be chemically uniform or chemically nonuniform. The term further encompasses so-called prepolymers too, i.e. reactive oligomeric initial adducts, the functional groups of which are involved in the formation of macromolecules.

"Molecular weight" refers to the molar mass (in g/mol) of a molecule or a molecule residue. "Average molecular weight" refers to the number-average molecular weight ($M_n$) of an oligomeric or polymeric mixture of molecules or molecule residues. It is typically determined by gel-permeation chromatography (GPC) against polydimethylsiloxane as standard.

The term "viscosity" refers to the dynamic viscosity or shear viscosity, which is defined by the ratio between the shear stress and the shear rate (speed gradient) and is determined as described in DIN EN ISO 3219. The measurement can be carried out at 23° C. using an MCR101 cone-plate viscometer from Anton Paar, Austria, with a type CP 25-1 cone. Unless otherwise stated, the reported viscosity values relate to a shear rate of $0.5\ s^{-1}$.

A substance or composition is referred to as "storage-stable" or "storable" when it can be stored at room temperature in a suitable container over a prolonged period, typically over at least 3 months up to 6 months or more, without this storage resulting in any change in its application or use properties to an extent relevant to its use.

The terms "mass" and "weight" are used synonymously in this document. Thus a "percentage by weight" (% by weight) refers to a percentage mass fraction that, unless otherwise stated, relates to the mass (the weight) of the total composition or, depending on the context, of the entire molecule.

"Room temperature" refers to a temperature of 23° C.

All industry standards and official standards mentioned in this document, unless otherwise stated, relate to the version valid at the time of filing of the first application.

In this document, a silane is a silicon compound that consists of a silicon atom and 4 functional groups or atoms attached to it. A siloxane is a compound that includes at least two silicon atoms bridged by an oxygen atom. Siloxanes are thus condensation products of silanes.

An organosilane is a monomeric silicon compound having at least one non-hydrolyzable group that is linked via a Si—C bond. An organosiloxane is a compound obtainable from the condensation of at least two organosilanes.

An alkoxysilane is a monomeric silane having at least one alkoxy group attached to the Si atom. A trialkoxysilane and a tetraalkoxysilane are a monomeric silane having respectively three and four alkoxy groups that are attached to the Si atom. The alkoxy group can be, for example, a $C_1$-$C_6$ alkoxy group. An alkoxysiloxane is a compound obtainable from the condensation of at least two alkoxysilanes, but still has at least one alkoxy group after the condensation.

An organoalkoxysilane is a monomeric silane having at least one alkoxy group and at least one non-hydrolyzable group that is linked via a Si—C bond. An organoalkoxysiloxane is a compound obtainable from the condensation of at least two organoalkoxysilanes or at least one alkoxysilane and an organoalkoxysilane, but still has at least one alkoxy group after the condensation.

The one-component moisture-curable silicone composition is in particular an RTV-1 silicone. Such RTV-1 silicones cure at room temperature through contact with water, generally through contact with atmospheric humidity in the air.

The one-component moisture-curable silicone composition comprises firstly one or more crosslinkable polydiorganosiloxanes. Such crosslinkable polydiorganosiloxanes are well known to the person skilled in the art. The crosslinkable polydiorganosiloxanes have hydroxyl groups attached to silicon, that is to say silanol groups, in particular two or more silanol groups, through which crosslinking is possible. These silanol groups may be in a side group or an end group of the polydiorganosiloxane, terminal hydroxyl groups being preferred. Such polydiorganosiloxanes having terminal silanol groups are also referred to as α,ω-functional polydiorganosiloxanes.

The hydroxyl groups on the polymers, more specifically the silanol groups, can react with the alkoxy groups of the crosslinker or of the other silanes or siloxanes in the composition to form a bond. This bond is formed in a condensation reaction. This generally results in the release of by-products such as water or alcohol. It is possible and even probable that the alkoxysilane may first hydrolyze to a silanol before the condensation takes place. These reactions take place preferentially and much more efficiently under the influence of a catalyst, as it is also contained in the composition of the invention. This is described further below.

The viscosity of the polydiorganosiloxanes may vary within wide ranges depending on the end use. The polydiorganosiloxane used in accordance with the invention may, at a temperature of 23° C., have for example a viscosity from 1000 to 350 000 mPa·s, preferably from 5000 to 120 000 mPa·s, and more preferably from 10 000 to 80 000 mPa·s.

The polydiorganosiloxane OH-PDMS is preferably a linear polydiorganosiloxane of the formula (I),

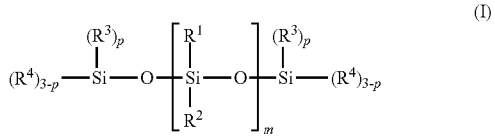

(I)

where the radicals $R^1$, $R^2$, and $R^3$ are independently linear or branched, monovalent hydrocarbyl radicals that have 1 to 12 carbon atoms and optionally include one or more heteroatoms, and optionally one or more C—C multiple bonds and/or optionally cycloaliphatic and/or aromatic components;

$R^4$ is a hydroxyl group;

the index p has a value of 0, 1 or 2; and the index m is chosen such that the polydiorganosiloxane OH-PDMS, at a temperature of 23° C., has a viscosity from 1000 to 350 000 mPa·s, preferably from 5000 to 120 000 mPa·s, and more preferably from 10 000 to 80 000 mPa·s, measured in accordance with DIN 53018.

In formula (I), the radicals $R^1$ and $R^2$ are preferably independently selected from alkyl groups having 1 to 5, in particular 1 to 3, carbon atoms, such as propyl, ethyl, and methyl, methyl being particularly preferred, wherein some of the alkyl groups, in particular methyl, may be optionally replaced by other groups such as vinyl, phenyl, or 3,3,3-trifluoropropyl. In formula (I), the radical $R^3$, if present, is preferably independently selected from phenyl, vinyl or methyl groups.

The radicals $R^1$, $R^2$, and $R^3$ in formula (I) are particularly preferably methyl groups.

The index m in formula (I) is chosen such that the polydiorganosiloxane has the viscosity indicated above. The index m in the formula (I) may, for example, be in the range from 10 to 5000 and preferably 100 to 1500.

The crosslinkable polydiorganosiloxane OH-PDMS is preferably a crosslinkable polydimethylsiloxane. The crosslinkable polydiorganosiloxanes OH-PDMS used are preferably hydroxy-terminated linear polydiorganosiloxanes, more preferably hydroxyl-terminated linear polydiorganosiloxanes (α,ω-hydroxy-functional polydiorganosiloxanes), the polydiorganosiloxane OH-PDMS preferably being a polydimethylsiloxane. The hydroxy-terminated linear polydiorganosiloxanes, in particular polydimethylsiloxanes, preferably have at 23° C. a viscosity, measured in accordance with DIN 53018, from 1000 to 350 000 mPa·s, preferably from 5000 to 120 000 mPa·s, more preferably from 10 000 to 80 000 mPa·s. As explained above, such polydimethylsiloxanes according to the prior art may be modified by partial incorporation of other organic groups instead of methyl.

The composition of the invention further contains 5 to 20 parts by weight of at least one hydrophilic silica KS per 100 parts by weight polydiorganosiloxane OH-PDMS.

A hydrophilic silica is a solid that consists predominantly of Si(—O)$_4$ units, but may also have surface silanol groups and has a three-dimensional, normally porous structure. The expression "hydrophilic" indicates that the silica has not been surface-treated with hydrophobizing additives.

Hydrophilic, i.e. untreated, silicas are well known as fillers and thickeners to the person skilled in the art. They can be produced, for example, via precipitation reactions (precipitated silica) or pyrolysis processes (fumed silica).

Fumed silica is preferred for the invention, since it has a lower water content as a consequence of the production process and does not need to be dried. Precipitated silicas are, however, also suitable.

Particularly preferred are silicas having a BET surface area from 50 to 300 m$^2$/g, preferably from 100 to 255 m$^2$/g.

The composition of the invention further comprises 1 to 10 parts by weight per 100 parts by weight polydiorganosiloxane OH-PDMS of at least one organoalkoxysilane or organoalkoxysiloxane crosslinker V that contains at least 2 alkoxysilane groups.

The crosslinker V has at least 2 alkoxysilane groups, preferably at least 3 or more (only in the case of a siloxane, i.e. of an oligomeric silane).

Suitable alkoxy groups are in particular methoxy, ethoxy, butoxy, and propoxy groups. Preference is given to methoxy and ethoxy groups.

In addition, the crosslinker V preferably has 1, 2 or more (only in the case of oligomeric siloxanes) non-hydrolyzable functional groups, in particular alkyl groups or alkenyl groups.

The non-hydrolyzable functional groups are preferably selected from methyl, ethyl, vinyl, n-propyl, cyclopentyl, phenyl, cyclohexyl, n-octyl, isooctyl, and hexadecyl.

It is also possible to use tetraalkoxysilanes as crosslinker V, in particular tetraethoxysilane and tetra-n-propoxysilane.

Specific examples of monomeric organoalkoxysilane crosslinkers V are methyltrimethoxysilane, ethyltrimethoxysilane, vinyltrimethoxysilane, phenyltrimethoxysilane, propyltrimethoxysilane, isooctyltrimethoxysilane, methylvinyldimethoxysilane or the corresponding compounds in which the methoxy group is replaced by ethoxy or propoxy, such as methyltriethoxysilane, vinyltriethoxysilane, phenyltriethoxysilane, methyltripropoxysilane, and phenyltripropoxysilane.

The oligomeric organoalkoxysiloxane crosslinkers V are condensation products of one or more such monomeric silane crosslinkers, optionally with the use of further silanes such as tetraalkoxysilanes. Oligomeric siloxanes of this kind are known and are commercially available, for example under the Dynasylan® 6490 trade names from Evonik Degussa GmbH.

Oligomers of functional silanes are three-dimensional compounds with complex structures made up of tetrahedral silane/siloxane units. The oligomeric siloxane may be formed, for example, from hydrolysis and condensation of one or more identical or different monomeric silanes.

A siloxane containing alkoxy groups may be linear, cyclic or three-dimensionally branched. It is preferably a siloxane containing oligomeric alkoxy groups.

An oligomeric siloxane of this kind contains functional groups that originate from the monomeric silanes used for the synthesis thereof. For example, an initial condensation of two tetramethoxysilane molecules results in a dimer containing six functional groups, with one functional group in each molecule forming the linkage through condensation. As already set out, the structure of the oligomers formed may be complex. The number of functional groups in the oligomer can vary according to the degree of condensation, nature of condensation, and monomeric silanes used, but is at least 2, but generally greater, for example 4 or more.

The degree of condensation of the oligomeric siloxane, i.e. the number of monomeric silanes condensed with one another, may vary within wide ranges according to the end use, but may, for example, be within the range from 2 to 200 and preferably from 4 to 50. It will be apparent that the degree of condensation, especially in the case of higher degrees of condensation, is frequently only an average.

The degree of condensation relates to the number of monomeric alkoxysilanes in the siloxane that are condensed with one another and can also be referred to as the degree of polymerization. The average degree of condensation of a siloxane containing alkoxy groups is at least 5, preferably at least 6, and more preferably at least 7. The average degree of condensation of the siloxane containing alkoxy groups may vary within wide ranges according to the end use and may preferably be, for example, not more than 15 and more preferably not more than 12. It will be apparent that the degree of condensation, especially in the case of higher degrees of condensation, is often an average, i.e. the siloxane is generally a mixture of compounds of varying degrees of condensation.

The average degree of condensation here means the average degree of condensation based on the number average. As is known to the person skilled in the art, this can be determined by measuring the siloxane by $^{29}Si$ NMR spectroscopy and evaluating the spectrum obtained. The measurement and determination can be carried out according to the details provided by J. Zhang et al, *J Sol-Gel Sci Technol*, 2010, 56, 197-202.

The organoalkoxysilane or organoalkoxysiloxane crosslinker V used for the silicone composition of the invention may of course also be any mixture of the abovementioned silanes and/or siloxanes.

The composition of the invention further comprises 1 to 7 parts by weight per 100 parts by weight polydiorganosiloxane OH-PDMS of an organoalkoxysilane or organoalkoxysiloxane AS that contains at least one aminoalkyl group having a primary amino group.

The structures of the organoalkoxysilane or organoalkoxysiloxane AS are essentially the same as those described above for the crosslinker V, particularly also in the case of the oligomeric siloxanes, but with the difference that the organoalkoxysilane or organoalkoxysiloxane AS contains at least one aminoalkyl group having a primary amino group. Monomeric organoalkoxysilanes AS may contain 1 or 2 aminoalkyl groups and 2 or 3 alkoxy groups per silicon atom; oligomeric organoalkoxysiloxanes AS may also have more or fewer amino groups.

The addition of the organoalkoxysilane or organoalkoxysiloxane AS results not only in the composition curing more rapidly as a consequence of the amino group having a co-catalytic effect, but surprisingly also results if all other constituents according to the invention (with restrictions concerning the organoalkoxysilane or organoalkoxysiloxane OS) are present in the compositions being self-leveling.

Specific examples of monomeric organoalkoxysilanes AS are 3-aminopropyltrimethoxysilane and 2-aminoethyl-3-aminopropyltrimethoxysilane and the corresponding compounds in which the methoxy group is replaced by ethoxy or propoxy, such as 3-aminopropyltriethoxysilane.

Specific examples of suitable oligomeric organoalkoxysiloxanes AS are those that are commercially available for example under the trade names Dynasylan® 1146 from Evonik Degussa GmbH or Hansa Care 8038 from CHT GmbH.

The composition of the invention further comprises up to 5 parts by weight per 100 parts by weight polydiorganosiloxane OH-PDMS of an organoalkoxysilane or organoalkoxysiloxane OS that contains at least two alkoxysilane groups, with the proviso that the reactivity in respect of hydrolysis of the organoalkoxysilane or organoalkoxysiloxane OS is greater than the reactivity in respect of hydrolysis of the organoalkoxysilane or organoalkoxysiloxane crosslinker V.

The role of the organoalkoxysilane or organoalkoxysiloxane OS is to allow the flow properties of the composition of the invention to be adjusted. Thus, the composition of the invention may be formulated entirely without (or with small proportions of) organoalkoxysilane or organoalkoxysiloxane OS, in which case it is present as a completely self-leveling, low-viscosity composition. By adding organoalkoxysilane or organoalkoxysiloxane OS, the creep resistance can however be adjusted if desired.

The effect thereof depends on the amount of organoalkoxysilane or organoalkoxysiloxane OS added. The larger the amount added, the greater the thickening effect. For example, a content of 0 to 1 parts by weight of a particular organoalkoxysilane or organoalkoxysiloxane OS results in a self-leveling composition being obtained, whereas a content of 1 to 5 parts by weight of the same organoalkoxysilane or organoalkoxysiloxane OS results in a composition that becomes more and more creep-resistant as the proportion of organoalkoxysilane or organoalkoxysiloxane OS increases being obtained. The extent of this thickening effect, or the amount of organoalkoxysilane or organoalkoxysiloxane OS that is required for a certain thickening effect, does of course depend on the nature of the organoalkoxysilane or organoalkoxysiloxane OS and on the nature and amount of the other constituents of the composition, such as silica KS. It is accordingly not possible to specify a generally applicable amount for all organoalkoxysilanes or organoalkoxysiloxanes OS in relation to an absolute thickening effect. However, irrespective of the nature of the organoalkoxysilane or organoalkoxysiloxane OS, it is the case that a larger amount thereof in the composition will exhibit a greater thickening effect.

Thus, with careful adjustment of the amount of organoalkoxysilane or organoalkoxysiloxane OS added, the desired flowability of a composition of the invention can be adjusted almost at will without extensive reformulations of the composition being necessary. Since the amount added varies only within a narrow range and the remaining constituents such as silica KS and crosslinker V remain unchanged, the effect on the mechanical properties of the cured composition, such as Shore A hardness, is minimal. This is a key advantage of the present invention.

The structures of the organoalkoxysilane or organoalkoxysiloxane OS are essentially the same as those described above for the crosslinker V, particularly also in the case of the oligomeric siloxanes.

What is, however, important is that the reactivity (in respect of hydrolysis and/or condensation) of the alkoxy groups of the silane or siloxane OS is greater than the reactivity of the silane or siloxane crosslinker V. This can be achieved in several ways:

Firstly, the crosslinker V can have alkoxy groups with a larger alkoxy radical than the silane or siloxane OS. For example, methoxysilanes are more reactive than ethoxysilanes, which in turn are more reactive than, for example, propoxysilanes.

Thus, in a preferred embodiment, the organoalkoxysilane or organoalkoxysiloxane crosslinker V, and in particular also the organoalkoxysilane or organoalkoxysiloxane AS, has ethoxy groups, whereas the organoalkoxysilane or organoalkoxysiloxane OS has methoxy groups.

Another possibility is to use so-called "alpha" silanes or siloxanes (α-silanes or siloxanes) as organoalkoxysilane or organoalkoxysiloxane OS. These are silanes or siloxanes that have a Si—$CH_2$—X functional group in which X is an organic radical attached to the methylene group via an oxygen or nitrogen atom. The heteroatom attached to the silicon atom via a methylene bridge gives rise to electronic effects that increase the reactivity of alkoxy groups on this silicon atom considerably. Through the use of such "alpha"

silanes or siloxanes OS, the effect according to the invention can also be achieved in compositions that employ only methoxysilanes and methoxysiloxanes or only ethoxysilanes and ethoxysiloxanes.

Thus, in a further preferred embodiment, all alkoxysilanes and alkoxysiloxanes used are methoxysilanes and methoxysiloxanes and the organoalkoxysilane or organoalkoxysiloxane OS has a Si—$CH_2$—X functional group in which X is an organic radical attached to the methylene group via an oxygen or nitrogen atom. X is particularly preferably a cyclohexylamino radical, an O-methylcarbamate radical or a methacryloyloxy radical, in particular a methacryloyloxy radical. This embodiment is particularly reactive and results in particularly good mechanical properties.

A further preferred embodiment corresponds to the one just mentioned, except that all the alkoxysilanes and alkoxysiloxanes used are ethoxysilanes and ethoxysiloxanes. This embodiment is particularly safe from a toxicological viewpoint, since no methanol is released.

A third way of achieving the difference in reactivity between crosslinker V and silane or siloxane OS is to use more highly functional silanes and/or siloxanes as silane or siloxane OS, for example trialkoxysilanes, while using less highly functional silanes and/or siloxanes as crosslinker V, for example dialkoxysilanes. Trialkoxysilanes are more reactive than the corresponding dialkoxysilanes.

Thus, in a further preferred embodiment, all the alkoxysilanes and alkoxysiloxanes used are methoxysilanes, and the organoalkoxysilane or organoalkoxysiloxane OS has predominantly trimethoxysilane groups, while the organoalkoxysilane or organoalkoxysiloxane crosslinker V has predominantly methyldimethoxysilane groups.

A fourth way of achieving the difference in reactivity between crosslinker V and silane or siloxane OS is to use silanes or siloxanes having at least one secondary amino group in at least one organic radical as silane or siloxane OS.

The secondary amino group achieves an increase in the reactivity of the alkoxysilane groups. Examples of such silanes or siloxanes OS are bis(trimethoxysilylpropyl)amine and N-(n-butyl)-3-aminopropyltrimethoxysilane, and also their analogs having ethoxysilane groups instead of methoxysilane groups.

Thus, in a further preferred embodiment, the organoalkoxysilane or organoalkoxysiloxane OS has at least one aminoalkyl radical containing a secondary amino group. However, these embodiments of the organoalkoxysilane or organoalkoxysiloxane OS must not have any primary amino groups, since they would otherwise have to be counted as organoalkoxysilane or organoalkoxysiloxane AS.

All silanes and siloxanes used in the context of this invention are preferably free of oxime groups. Oxime groups include aldoxime groups and ketoxime groups. Such oxime groups are in the prior art usually present in the crosslinker of one-component moisture-curable silicone formulations when faster curing through the addition of water is desirable. As explained above, the presence of such oxime groups means that oximes having an unpleasant odor are released during curing.

The composition of the invention further comprises 0.1 to 7 parts by weight of at least one tin catalyst K. These are used for catalysis of the condensation/crosslinking that takes place between the crosslinkable polydiorganosiloxane and the crosslinker (and further silane-functional constituents) in the presence of moisture/water, and/or for catalysis of the preceding hydrolysis in the case of alkoxysilane groups.

The tin catalyst K is in particular an organotin compound. Preferred organotin compounds are dialkyltin compounds, selected for example from dimethyltin di-2-ethylhexanoate, dimethyltin dilaurate, di-n-butyltin diacetate, di-n-butyltin di-2-ethylhexanoate, di-n-butyltin dicaprylate, di-n-butyltin di-2,2-dimethyloctanoate, di-n-butyltin dilaurate, di-n-butyltin distearate, di-n-butyltin dimaleate, di-n-butyltin dioleate, di-n-octyltin di-2-ethylhexanoate, di-n-octyltin di-2,2-dimethyloctanoate, di-n-octyltin dimaleate, di-n-octyltin dilaurate, di-n-butyltin oxide, and di-n-octyltin oxide.

Other common metal catalysts such as titanates have been found to be unsuitable or less suitable for the composition of the invention. It has also been found that rapid curing requires the presence of the organoalkoxysilane or organoalkoxysiloxane AS essential to the invention.

The composition of the invention may optionally also comprise further constituents such as those customary in one-component moisture-curable silicone formulations. Examples of such additives are plasticizers, inorganic and/or organic fillers, odorants, wetting auxiliaries, pigments, adhesion promoters, processing auxiliaries, rheology modifiers, stabilizers, dyes, inhibitors, heat stabilizers, antistats, flame retardants, biocides, waxes, leveling agents, thixotropic agents, and hydroxy-functional polyols.

Preferably, the silicone formulation optionally includes one or more additional fillers. The fillers may influence, for example, both the rheological properties of the uncured formulation and the mechanical properties and surface characteristics of the cured formulation. It may be advantageous to use a mixture of different fillers.

Examples of suitable fillers are inorganic or organic fillers, such as natural, ground or precipitated calcium carbonates or chalks, which are optionally surface-treated, for example with fatty acids, surface-treated silicas, in particular fumed silicas, aluminum hydroxides such as aluminum trihydroxide, carbon black, in particular industrial carbon blacks, barium sulfate, dolomite, silicas, kaolin, hollow beads, quartz, calcined aluminum oxides, aluminum silicates, magnesium aluminum silicates, zirconium silicates, cristobalite flour, diatomaceous earths, micas, titanium oxides, zirconium oxides, gypsum, graphite, carbon fibers, zeolites or glass fibers, the surface of which is optionally treated with a hydrophobizing agent.

An example of polydimethylsiloxane plasticizers W-PDMS that may optionally be used comprises trialkylsilyl-terminated polydimethylsiloxanes, the trialkylsilyl-terminated polydimethylsiloxanes preferably having a viscosity at 23° C. in the range from 1 to 10 000 mPa·s. For example, it is also possible to use trimethylsilyl-terminated polydimethylsiloxanes in which some of the methyl groups have been replaced by other organic groups such as phenyl, vinyl or trifluoropropyl groups. The polydimethylsiloxane plasticizer W-PDMS may also be monofunctional, i.e. reactive at one end, for example via a hydroxy end group. Certain hydrocarbons may likewise be used as plasticizers.

The constituents of the composition of the invention may be mixed with one another in a customary manner, for example with the aid of a suitable mixing unit, such as a mechanical or planetary mixer.

In preferred embodiments, the composition of the invention additionally contains one or more of the following constituents:

g) 5 to 40 parts by weight of reactive or unreactive polydimethylsiloxane plasticizer W-PDMS, and/or
h) up to 150 parts by weight of other fillers, in particular chalk; and/or
i) pigments, in particular carbon black, adhesion promoters, biocides, fragrances, drying agents, and/or organic extenders.

The composition of the invention is preferably free of oxime compounds.

The invention further provides for the use of up to 5 parts by weight of an organoalkoxysilane or organoalkoxysiloxane OS that contains at least two alkoxysilane groups, for adjusting the flow properties of a one-component moisture-curable silicone composition comprising
a) 100 parts by weight of at least one crosslinkable polydiorganosiloxane OH-PDMS having silanol end groups and a viscosity at 23° C. of 1000 to 350 000 mPa·s, measured in accordance with DIN EN ISO 3219;
b) 5 to 20 parts by weight of at least one hydrophilic silica KS;
c) 1 to 10 parts by weight of at least one organoalkoxysilane or organoalkoxysiloxane crosslinker V that contains at least 2 alkoxysilane groups;
d) 1 to 7 parts by weight of an organoalkoxysilane or organoalkoxysiloxane AS that contains at least one aminoalkyl group having a primary amino group;
e) 0.1 to 7 parts by weight of at least one tin catalyst K;
wherein the silicone composition contains less than 1.0% by weight of water based on the total composition, with the proviso that the reactivity in respect of hydrolysis of the organoalkoxysilane or organoalkoxysiloxane OS is greater than the reactivity in respect of hydrolysis of the organoalkoxysilane or organoalkoxysiloxane crosslinker V.

The composition of the invention may be used as an adhesive, coating or sealant in a method for bonding or joining substrates. The method of the invention comprises
a) the application of the composition to a substrate and contacting of the mixture applied to the substrate with a further substrate in order to obtain an adhesive bond between the substrates, or the introduction of the composition into a gap between two substrates in order to obtain a join between the substrates, and
b) the curing of the mixture,
wherein step b) preferably takes place through the action of atmospheric moisture.

The composition of the invention is stored in an airtight container, for example a cartridge, a bag or a hobbock, and is thus storage stable. In order to ensure good storage stability, the silicone composition of the invention comprises less than 1.0% by weight of water, preferably less than 0.5% by weight of water, more preferably less than 0.1% by weight of water, based on the total composition. A low water content may in particular be achieved by predrying the constituents of the invention, in particular the hydrophilic silica KS. Heat and/or vacuum treatments have been found to be suitable therefor. These are known to the person skilled in the art of silicone formulation.

For application, the container is opened and the composition then immediately applied to or introduced onto the substrate or into the bonded joint using a hand-held device, for example a gun, or using an automated application device.

Application to a substrate or introduction into a gap between substrates according to step a) of the method mentioned above may be carried out in a customary manner, for example manually or in an automated process with the aid of robots. During bonding, the substrate provided with the mixture is contacted with a further substrate, optionally under pressure, in order to obtain an adhesive bond between the substrates. The mixture is then left to cure in step b), usually at room temperature, in order to achieve the bonding or joining of the substrates. In this way, the bonded or joined substrates of the invention are obtained with the cured composition as adhesive or sealant material.

The substrates to be bonded, coated, potted or joined may be of the same material or a different material. All customary materials may be bonded, coated, potted or joined with the one-component composition of the invention. Preferred materials for bonding, coating, potting or joining are glass, metals, such as aluminum, copper, steel or stainless steel, concrete, mortar, building stones such as sandstone and sand-lime brick, asphalt, bitumen, plastics, such as polyolefins, PVC, polyvinyl fluoride, PET, polyamide, polycarbonate, polystyrene or polyacrylate, and composite materials such as CFRP.

The one-component composition of the invention may thus be used as an adhesive, coating, potting compound or sealant, for example in the following sectors: construction, the sanitary sector, the automotive sector, solar power, wind power, white goods, facade and window construction, electronics, and boat- and shipbuilding.

EXAMPLES

Specific embodiments of the invention are described hereinbelow, but are not intended to limit the scope of the invention.

The chemicals used are listed in table 1 below.

TABLE 1

Chemicals used
Unless stated otherwise, figures are based on weight.

| Name | Description |
|---|---|
| OH-PDMS | α,ω-Bis-OH-poly(dimethylsiloxane) having a viscosity of 20 000 mPas at 23° C. |
| W-PDMS 1 | α,ω-Bis(trimethylsilyl)-poly(dimethylsiloxane) having a viscosity of 100 mPas at 23° C. |
| W-PDMS 2 | α,ω-Bis(trimethylsilyl)-poly(dimethylsiloxane) having a viscosity of 10 mPas at 23° C. |
| Crosslinker V1 | Methyltrimethoxysilane |
| Crosslinker V2 | Vinyltrimethoxysilane |
| Crosslinker V3 | Methylvinyldimethoxysilane |
| Crosslinker V4 | Dynasilan ® 6490 (Evonik), oligomeric siloxane containing vinylsilane and methoxysilane groups. |
| Silica KS | Hydrophilic fumed silica having a BET surface area of 150 m$^2$/g |
| Filler | Ground, natural calcium carbonate (marble) |
| Silane AS 1 | 3-Aminopropyltrimethoxysilane |
| Silane AS 2 | N-(2-Aminoethyl)-3-aminopropyltrimethoxysilane |
| Siloxane AS 3 | Hansa Care 8038 (CHT), oligomeric siloxane containing primary amino groups; 3.8% by weight of nitrogen, 50-200 mPa · s |
| Silane OS 1 | (Methacryloyloxymethyl)methyldimethoxysilane |
| Silane OS 2 | Methacryloyloxymethyl)trimethoxysilane |
| Silane OS 3 | Bis(trimethoxysilylpropyl)amine |
| Silane OS 4 | N-(n-Butyl)-3-aminopropyltrimethoxysilane |
| Additive | EO-PO block copolymer having 40% EO content |
| Tin catalyst | Reaction product of dibutyltin oxide and tetraethoxysilane |

The proportions (parts by weight) of the constituents for the example compositions given in tables 2 to 4 below were weighed out and mixed on a Hauschild SpeedMixer at 23° C. and 50% RH for 20 s at 2000 rpm with application of vacuum. The mixtures obtained were stored in an airtight container at 23° C.

In addition, tables 2 to 4 contain the summaries of the measurement results. All tests were carried out at 23° C. and 50% RH (relative humidity).

The Shore A hardness was determined after curing the samples for 7 days at 23° C. and 50% RH; this was done on a Shore A hardness tester from Bareiss in accordance with DIN ISO 7619-1. For determination of the Shore A hardness, round test specimens having a diameter of 42 mm and a thickness of 6 mm were produced.

Viscosity was determined at 23° C. in accordance with DIN EN ISO 3219 using a MCR101 cone-plate viscometer from Anton Paar, Austria, with a type CP 25-1 cone and a distance of 0.049 mm. The reported viscosity values relate to a shear rate of 0.1 s$^{-1}$.

The flow properties at rest were determined by applying the compositions at 23° C./50% RH to a vertically mounted cardboard base from a 300 ml PE cartridge using a handgun. Approx. 20 ml was in each case applied to a base area of approx. 3 cm$^2$.

After 24 h, the length of the run trail (in mm) was measured.

TABLE 2

Compositions and measurement results.

| Test | Z-1 (ref.) | Z-2 | Z-3 | Z-4 |
|---|---|---|---|---|
| OH-PDMS | 100 | 100 | 100 | 100 |
| W-PDMS 1 | 30 | 30 | 30 | 30 |
| Crosslinker V1 | 6.5 | 6.5 | 6.5 | 6.5 |
| Filler | 90 | 90 | 90 | 90 |
| Silica KS | 8 | 8 | 8 | 8 |
| Tin catalyst | 0.1 | 0.1 | 0.1 | 0.1 |
| Silane AS 1 | — | 2 | — | 2 |
| Siloxane AS 3 | — | — | 4 | — |
| Silane OS 2 | — | 0 | 0 | 2 |
| Viscosity [mPa·s] | 12 300 | 9760 | 6720 | 15 600 |
| Shore A hardness | n/g | 23.3 | 20 | 23 |
| Comments | Creep-resistant, non-curing | Self-leveling, curing | Self-leveling, curing | Creep-resistant, curing |

"n/g" denotes: Not cured.

TABLE 3

Compositions and measurement results.

| Test | Z-5 | Z-6 | Z-7 | Z-8 (ref.) |
|---|---|---|---|---|
| OH-PDMS | 100 | 100 | 100 | 100 |
| W-PDMS 2 | 25 | 25 | 25 | 25 |
| Crosslinker V2 | 1 | 1 | 1 | 1 |
| Crosslinker V3 | — | — | 2 | 2 |
| Crosslinker V4 | 3.5 | 3.5 | 3.5 | 3.5 |
| Additive | 0.5 | 0.5 | 0.5 | 0.5 |
| Filler | 90 | 90 | 90 | 90 |
| Silica KS | 8 | 8 | 8 | 8 |
| Tin catalyst | 0.1 | 0.1 | 0.1 | 0.1 |
| Silane AS 2 | 2 | 2 | 2 | — |
| Silane OS 1 | 2 | 0 | 0 | — |
| Viscosity [mPa·s] | 9390 | 6810 | 5450 | 10 800 |
| Shore A hardness | 31 | 30 | 31 | n/g |
| Run trail [mm] | 0 | 54 | 102 | 0 |
| Comments | Creep-resistant, curing | Self-leveling, curing | Self-leveling, curing | Creep-resistant, non-curing |

"n/g" denotes: Not cured.

TABLE 4

Compositions and measurement results.

| Test | Z-9 | Z-10 | Z-11 | Z-12 |
|---|---|---|---|---|
| OH-PDMS | 100 | 100 | 100 | 100 |
| W-PDMS 2 | 25 | 25 | 25 | 25 |
| Crosslinker V2 | 3.5 | 3.5 | 3.5 | 3.5 |

TABLE 4-continued

Compositions and measurement results.

| Test | Z-9 | Z-10 | Z-11 | Z-12 |
|---|---|---|---|---|
| Crosslinker V3 | 2 | 2 | 2 | 2 |
| Crosslinker V4 | 1 | 1 | 1 | 1 |
| Additive | 0.5 | 0.5 | 0.5 | 0.5 |
| Filler | 90 | 90 | 90 | 90 |
| Silica KS | 9 | 9 | 9 | 9 |
| Tin catalyst | 0.09 | 0.09 | 0.09 | 0.09 |
| Silane AS 2 | 1 | 1 | 1 | 1 |
| Silane OS 3 | 0 | 0.1 | 1 | 0 |
| Silane OS 4 | 0 | 0 | 0 | 0.1 |
| Viscosity [mPa·s] | 4900 | 7620 | 8670 | 10 140 |
| Shore A hardness | 29 | 32 | 32 | 31 |
| Run trail [mm] | 170 | 71 | 63 | 43 |
| Comments | Self-leveling, curing | Self-leveling, curing | Self-leveling, curing | Creep-resistant, curing |

The invention claimed is:

1. A method for adjusting the flow properties of a one-component moisture-curable silicone composition, the method comprising:
adding more than 0 and up to 5 parts by weight of an organoalkoxysilane or organoalkoxysiloxane (OS) that contains at least two alkoxysilane groups to a one-component moisture-curable silicone composition comprising:
 a) 100 parts by weight of at least one crosslinkable polydiorganosiloxane (OH-PDMS) having silanol end groups and a viscosity at 23° ° C.of 1000 to 350000 mPa·s, measured in accordance with DIN EN ISO 3219;
 b) 5 to 20 parts by weight of at least one hydrophilic silica (KS);
 c) 1 to 10 parts by weight of at least one organoalkoxysilane or organoalkoxysiloxane crosslinker V that contains at least 2 alkoxysilane groups;
 d) 1 to 7 parts by weight of an organoalkoxysilane or organoalkoxysiloxane (AS) that contains at least one aminoalkyl group having a primary amino group; and
 e) 0.1 to 7 parts by weight of at least one tin catalyst (K);
wherein:
the silicone composition contains less than 1.0% by weight of water based on the total composition,
the reactivity with respect to hydrolysis of the organoalkoxysilane or organoalkoxysiloxane (OS) is greater than the reactivity with respect to hydrolysis of the organoalkoxysilane or organoalkoxysiloxane crosslinker (V), and
the organoalkoxysilane (OS) is selected from:
(methacryloyloxymethyl)methyldimethoxysilane,
(methacryloxymethyl)trimethoxysilane,
bis(trimethoxysilylpropyl)amine, and
N-(n-butyl)-3-aminopropyltrimethoxysilane.

2. The method as claimed in claim 1, wherein the polydiorganosiloxane (OH-PDMS) is a linear polydiorganosiloxane of the formula (I),

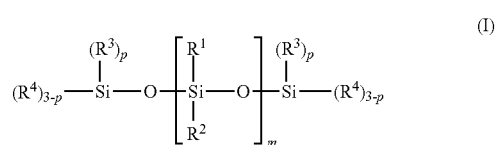

where:
the radicals $R^1$, $R^2$, and $R^3$ are independently linear or branched, monovalent hydrocarbyl radicals that have 1 to 12 carbon atoms and optionally include one or more heteroatoms, and optionally one or more C-C multiple bonds and/or optionally cycloaliphatic and/or aromatic components;

$R^4$ is a hydroxyl group;

the index p has a value of 0, 1 or 2; and the index m is chosen such that the polydiorganosiloxane (OH-PDMS), at a temperature of 23° C., has a viscosity from 1000 to 350000 mPa·s, measured in accordance with DIN EN ISO 3219.

3. The method as claimed in claim 2, wherein the radicals $R^1$, $R^2$, and $R^3$ are methyl groups.

4. The method as claimed in claim 1, wherein the polydiorganosiloxane (OH-PDMS), at a temperature of 23° C., has a viscosity from 5000 to 120000 mPa·s, measured in accordance with DIN EN ISO 3219.

5. The method as claimed in claim 1, wherein the organoalkoxysilane or organoalkoxysiloxane crosslinker (V) includes at least one non-hydrolyzable functional group selected from methyl, ethyl, vinyl, n-propyl, cyclopentyl, phenyl, cyclohexyl, n-octyl, isooctyl, and hexadecyl.

6. The method as claimed in claim 1, wherein the organoalkoxysilane or organoalkoxysiloxane (OS) has at least one aminoalkyl radical containing a secondary amino group.

7. The method as claimed in claim 1, wherein the organoalkoxysilane or organoalkoxysiloxane (OS) has a Si-$CH_2$-X functional group in which X is an organic radical attached to the methylene group via an oxygen or nitrogen atom.

8. The method as claimed in claim 7, wherein X is a cyclohexylamino radical, an O-methylcarbamate radical or a methacryloyloxy radical.

9. The method as claimed in claim 1, wherein the hydrophilic silica (KS) is a fumed silica.

10. The method as claimed in claim 1, wherein the silicone composition additionally comprises:
f) 5 to 40 parts by weight of reactive or unreactive polydimethylsiloxane plasticizer (W-PDMS), and/or
g) up to 150 parts by weight of other fillers; and/or
h) pigments, adhesion promoters, biocides, fragrances, drying agents, and/or organic extenders.

11. The method as claimed in claim 1, wherein the silicone composition is free of oxime compounds.

12. The method as claimed in claim 1, wherein 0.1 to 5 parts by weight of the organoalkoxysilane or organoalkoxysiloxane (OS) is added to the silicone composition.

* * * * *